June 11, 1963  N. R. KRONINGER  3,093,777
MULTI-SPEED SERVO SYSTEM CROSSOVER NETWORK
Filed Feb. 28, 1961
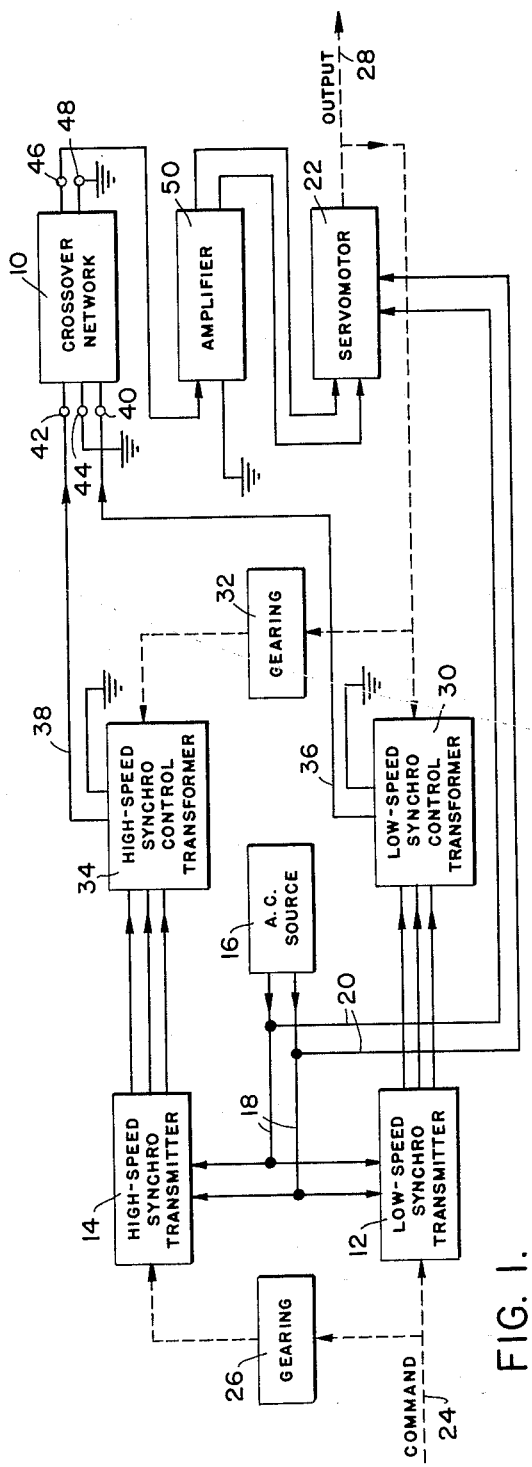
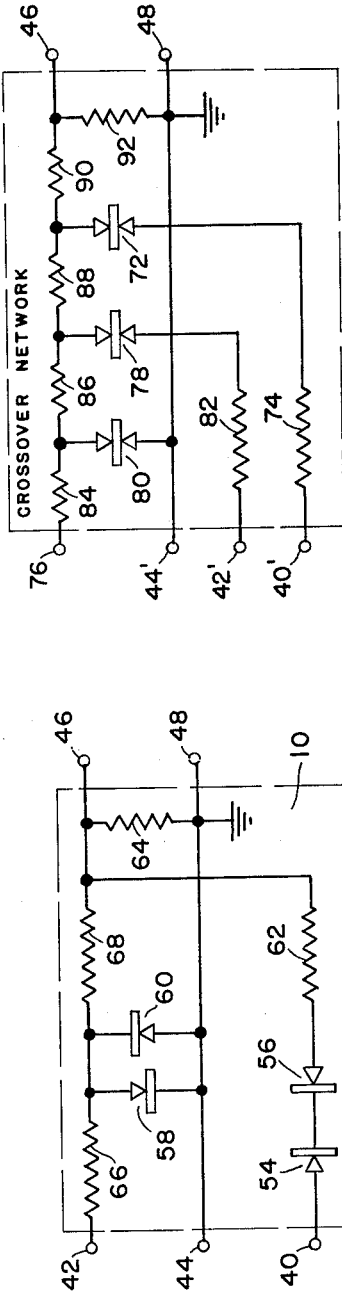
INVENTOR.
NOLAN R. KRONINGER
BY
*J.C. Mueller*
ATTORNEY.

United States Patent Office 3,093,777
Patented June 11, 1963

3,093,777
MULTI-SPEED SERVO SYSTEM CROSSOVER NETWORK
Nolan R. Kroninger, Sepulveda, Calif., assignor, by mesne assignments, to the United States of America as represented by the Secretary of the Navy
Filed Feb. 28, 1961, Ser. No. 92,427
6 Claims. (Cl. 318—30)

The present invention relates to signal transfer circuits and more particularly to a servo error signal crossover network for use in multi-speed servo systems.

While applicable in principle to many types of servo systems and to other apparatus, the invention is directly intended for use in data transmission or positional transmission systems having input and output misalignment detectors of synchro type, and the invention will be exemplarily described in positional transmission system environment.

Principally for the purpose of reducing the static error of positional transmission servo systems employing synchros, which synchros are inherently of limited accuracy, it is the general practice to employ a multi-speed arrangement wherein the system includes one or more auxiliary or so-called fine or high-speed synchro transmitters and synchro control transformers, driven through step-up gearing by the primary or so-called coarse or low-speed synchro transmitter and synchro control transformer, the low-speed and high-speed synchro channels thus providing high-speed servo error signals in addition to the low-speed servo error signals. Such a multi-speed servo system further includes a servo error signal crossover network, preferably of so-called continuous switching type employing electronic elements rather than of discontinuous switching type employing relays, which is intended to effect transfer of servo control from the low-speed to a high-speed synchro error signal, dependent upon the reaching of a preselected servo error magnitude as a position correspondence condition is approached. By use of such technique, the static positional error of the servo system may be greatly reduced.

In actual practice heretofore, a typical continuous switching crossover network employs non-linear elements in a circuit which combines the low and high speed servo error signals in variable proportion dependent upon low-speed error signal magnitude, yielding a servo amplifier control voltage wherein the low-speed or high-speed component, as the case may be, dependent upon the error condition of the servo system, simply tends to predominate, that is, without elimination or reduction of the remaining component to zero magnitude. Taking into consideration the fact that servo system manufacture must tolerate some degree of mechanical and electrical misalignment, which results in a lack of correspondence between the synchro null positions corresponding to zero magnitudes of the low-speed and high-speed servo error signals, such prior art crossover networks therefore present an operational defect in that the control voltage, at the high-speed servo error signal null position, may include a low-speed servo error signal component, thus causing the servo system to yield a positional error rather than to desirably yield a true correspondence position dictated by the high-speed synchro channel alone.

It is the general purpose and an object of the present invention to provide a new and improved continuous switching type of crossover network, for use in a multi-speed servo system, which operates to bring the servo system under full control of a high-speed servo error signal as data or position correspondence is approached.

It is another object of the invention to provide a crossover network, of continuous switching type and for use in a multi-speed servo system, which operates to reduce a servo amplifier control voltage component to substantially zero value when the corresponding servo error signal is of magnitude less than a selected switchover threshold.

A further object of the invention is to provide a multi-speed servo system crossover network for effectively eliminating a control voltage low-speed component as position correspondence is approached, and to accomplish this by use of a new and improved crossover network of continuous switching type and employing a minimum number of circuit elements.

Other objects and many of the attendant advantages of this invention will be readily appreciated as the same becomes better understood by reference to the following detailed description when considered in connection with the accompanying drawing wherein:

FIG. 1 illustrates, in block diagram form, the association of a crossover network in a typical two-speed servo system;
FIG. 2 is a schematic circuit of an embodiment of the novel crossover network; and
FIG. 3 illustrates, in schematic circuit form, another embodiment of the invention as applied for use in a multi-speed servo system.

First considering the general configuration and operation of an exemplary servo system including a crossover network, and referring to FIG. 1, the schematically illustrated two-speed arrangement employs various units which may each be entirely conventional, except as to circuitry of the crossover network 10 which is detailed in FIGS. 2 and 3 and later described. The rotors (not shown) of the low-speed and high-speed synchro transmitters 12 and 14 are excited by A.C. source 16 via leads 18, which source also supplies, via leads 20, a reference-phase voltage to servomotor 22. Input or command shaft 24 as here indicated schematically is directly coupled to the rotor of low-speed synchro transmitter 12, and through step-up gearing 26 to the rotor of high-speed synchro transmitter 14. The output or controlled shaft 28, driven by servomotor 22, is directly coupled to the rotor (not shown) of low-speed synchro control transformer 30, and through step-up gearing 32 of like ratio to the rotor (not shown) of high-speed synchro control transformer 34. Low-speed and high-speed synchro control transformers 30 and 34 deliver low-speed and high-speed servo error signals, respectively, via leads 36 and 38 to input terminals 40 and 42, respectively, of crossover network 10, the signal circuits being completed in this instance by the grounded output leads of the synchro control transformers and the grounded input terminal 44 of crossover network 10. The control voltage derived by the novel circuitry of crossover network 10, as next described, is supplied as indicated via terminals 46 and 48 to the servo amplifier 50, the latter operating to supply an increased voltage of like phase to servomotor 22.

Referring now to FIG. 2 which illustrates basic circuitry of the novel and improved crossover network, it is to be understood that diodes 54 and 56 in particular are specifically of the type commonly termed Zener diodes, presently available as silicon diodes, having the property of abruptly changing their conduction characteristics in both the forward and reverse applied voltage regions. Such diodes exhibit very high back-resistance for values of reverse voltage ranging from zero to a Zener value of say 3.5 volts, a comparatively low back-resistance for reverse voltages exceeding the Zener value, very high forward-resistance for values of diode voltage ranging from zero to say 0.6 volts, and comparatively low forward-resistance for voltages greater than the latter voltage level. Diodes 58 and 60 are preferably also of Zener type.

In the low-speed section of crossover network 10, between input terminals 40 and 44, diodes 54 and 56 are oppositely poled and connected in series with limiting resistor 62 and output resistor 64. With such configuration, diodes 54 and 56 operate alternately in their very high back-resistance mode, but pass very little current when the applied low-speed servo error signal is of magnitude less than a switchover threshold dependent upon the particular diode characteristics and resistor values employed. Output resistor 64 is selected to be of sufficiently small ohmic value, relative to the combined resistance presented by resistor 62 and the high back-resistance condition of the diodes, so that, due to the very small current, and by voltage divider action, the low-speed control voltage component developed across output resistor 64 is negligible under this condition. When the applied low-speed servo error signal exceeds the switchover threshold value, Zener diodes 54 and 56 in effect break down (alternately) and operate in their low-resistance mode, developing a control voltage, across output resistor 64, corresponding to the low-speed servo error. Resistor 62 is selected to be of sufficiently large ohmic value to suitably limit the maximum current under such condition.

In the high-speed section of crossover network 10, between input terminals 42 and 44, limiting resistor 66 is connected in series with paralleled diodes 58 and 60, these diodes also being oppositely poled so that they provide forward conduction alternately and, taken altogether, provide a bilateral conduction path despite the cyclic change in polarity of the applied high-speed servo error signal. The voltage appearing across diodes 58 and 60 varies in accordance with the high-speed servo error signal delivered to input terminals 42 and 44, up to a predetermined limit dependent upon the Zener characteristic of these diodes, and a corresponding high-speed control voltage component is developed across output resistor 64 by divider action of resistors 64 and 68. During operation of the servo system under the condition in which the low-speed error signal falls below the switchover threshold, the voltage appearing across output resistor 64 is effectively only that component which corresponds to the high-speed error signal. Resistors 62 and 68 also serve with output resistor 64 as a summing network, and resistor 68 further serves to substantially isolate the low-speed section of the crossover network.

While the embodiment illustrated in FIG. 2, described above, specifically concerns a two-speed crossover network, the invention may also be practiced in connection with multi-speed servo systems wherein a crossover network must be capable of switching between more than two servo error signal channels. An exemplary application of the invention for such use is illustrated in FIG. 3, the low-speed error signal channel therein again employing a pair of series-connected, oppositely poled Zener-type diodes, here illustrated as a single back-to-back unit 72 connected in series with limiting resistor 74, between terminals 40' and 44' which correspond to terminals 40 and 44 of FIGS. 1 and 2. While the high-speed servo error signal section in FIG. 2 employs a pair of paralleled oppositely-poled Zener diodes 58 and 60 as illustrated and described, a back-to-back unit can be employed in the combination without affecting the desired switching action of the low-speed servo error signal section. Thus, the high-speed servo error signal section between terminals 42' and 44', and the higher-speed servo error signal section between terminals 76 and 44', are illustrated as employing Zener diode series units 78 and 80, respectively. Resistors 82 and 84 are current limiting resistors in these latter sections, and the remaining resistors 86, 88 and 90 serve both to suitably set the switchover thresholds, and to provide a ladder-type summing network.

It will now be apparent that the present invention provides a novel and improved crossover network combination, for use particularly in multi-speed servo systems, which functions to effectively eliminate servo system controlling action of a low-speed servo error signal when it falls below a predetermined switchover threshold, in favor a high-speed servo error signal, thus providing significantly improved accuracy of servo system operation.

Various modifications will occur to those skilled in the art. For example, the described embodiments may be modified to employ other summing arrangements, or modified to provide so-called stickoff voltages, or to additionally include damping circuitry, as often used in servomechanism practice.

Obviously many modifications and variations of the present invention are thus possible in the light of the above teachings. It is therefore to be understood that within the scope of the appended claims the invention may be practiced otherwise than as specifically described.

What is claimed is:

1. In a multi-speed servo system signal transfer network for derivation, from low-speed and high-speed servo error signals applied to its input leads, of a control voltage for servo drive means, in combination: a low-speed section responsive to said low-speed servo error signal to provide a control voltage low-speed component; a high-speed section responsive to said high-speed servo error signal to provide a control voltage high-speed component; and circuit means including an output resistor associating said low-speed and high-speed sections to yield said servo drive means control voltage; wherein said low-speed section includes, in serial connection between said low-speed error signal input lead and said output resistor, a pair of series-connected oppositely-poled Zener diodes, whereby to provide a control voltage low-speed component across said output resistor, and whereby to reduce said control voltage low-speed component effectively to zero value when the low-speed servo error signal is of magnitude less than a predetermined threshold value.

2. A combination as defined in claim 1, wherein said high-speed section comprises a resistor serially connected with a pair of oppositely-poled Zener diodes between high-speed error signal input leads, and wherein said control voltage high-speed component is derived from the voltage developed across said pair of Zener diodes.

3. A combination as defined in claim 2, wherein said circuit means includes an isolation resistor preventing the Zener diodes in said high-speed section from substantially affecting the value of control voltage low-speed component developed across said output resistor.

4. For use in a multi-speed servo system having servo drive means, and error detection means which provide low-speed and high-speed servo error signals for control of said servo drive means, an error signal transfer network comprising: a low-speed section having a first pair of oppositely-poled Zener diodes and an output resistor, all serially connected between low-speed error signal input leads, said low-speed section operating to provide, in said output resistor, a first current which varies directly with said low-speed error signal but limited to substantially zero level for low-speed signals of magnitude less than a predetermined threshold value; a high-speed section responsive to said high-speed servo error signal to provide a voltage which varies directly with said high-speed error signal but limited to a predetermined maximum magnitude; and circuit means coupling said voltage to said output resistor and providing therein a second current corresponding to said voltage; whereby said network is responsive to applied low-speed and high-speed error signals to develop, across said output resistor, a control voltage for application to said servo drive means, said control voltage having low-speed and high-speed components corresponding to said low-speed error signal and said voltage, respectively, and said network operating to reduce said low-speed component effectively to zero level when the low-speed error signal is of magnitude less than said predetermined threshold value.

5. For use in a multi-speed servo system having servo drive means, and error detection means which provide low-speed and high-speed servo error signals for control of said servo drive means, an error signal transfer network comprising; a low-speed section having a first pair of oppositely-poled Zener diodes and an output resistor, all serially connected between low-speed error signal input leads, said low-speed section operating to provide, in said output resistor, a first current which varies directly with said low-speed error signal but limited to substantially zero level for low-speed signals of magnitude less than a predetermined threshold value; a high-speed section having a resistor serially connected with a second pair of oppositely-poled Zener diodes between high-speed error signal input leads, said high-speed error signal section operating to provide, across said second pair of diodes, a voltage which varies directly with said high-speed error signal but limited to a predetermined maximum magnitude; and circuit means coupling said voltage to said output resistor and providing therein a second current corresponding to said voltage; whereby said network is responsive to applied low-speed and high-speed error signals to develop, across said output resistor, a control voltage for application to said servo drive means, said control voltage having low-speed and high-speed components corresponding to said low-speed error signal and said voltage, respectively, and said network operating to reduce said low-speed component effectively to zero level when the low-speed error signal is of magnitude less than said predetermined threshold value.

6. A combination as defined in claim 5, wherein said circuit means includes an isolation resistor preventing the Zener diodes in said high-speed section from substantially affecting the value of control voltage low-speed component developed across said output resistor.

References Cited in the file of this patent
UNITED STATES PATENTS

| | | |
|---|---|---|
| 2,424,568 | Isbister | July 29, 1947 |
| 2,455,364 | Hays | Dec. 7, 1948 |
| 2,511,863 | McCoy | June 20, 1950 |